US009663404B2

(12) United States Patent
de Diego et al.

(10) Patent No.: US 9,663,404 B2
(45) Date of Patent: May 30, 2017

(54) METHOD OF FORMING A CERAMIC MATRIX COMPOSITE AND A CERAMIC MATRIX COMPONENT

(75) Inventors: Peter de Diego, Greenville, SC (US); James Zhang, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 893 days.

(21) Appl. No.: 13/342,498

(22) Filed: Jan. 3, 2012

(65) Prior Publication Data

US 2013/0171426 A1  Jul. 4, 2013

(51) Int. Cl.
| | | |
|---|---|---|
| *B32B 3/26* | (2006.01) | |
| *B28B 5/00* | (2006.01) | |
| *C04B 35/14* | (2006.01) | |
| *C04B 35/117* | (2006.01) | |
| *C04B 35/185* | (2006.01) | |

(Continued)

(52) U.S. Cl.
CPC ............ *C04B 35/14* (2013.01); *C04B 35/117* (2013.01); *C04B 35/185* (2013.01); *C04B 35/481* (2013.01); *C04B 35/488* (2013.01); *C04B 35/52* (2013.01); *C04B 35/5805* (2013.01); *C04B 35/653* (2013.01); *F01D 5/20* (2013.01); *C04B 2235/3217* (2013.01); *C04B 2235/3244* (2013.01); *C04B 2235/3248* (2013.01); *C04B 2235/3418* (2013.01); *C04B 2235/3463* (2013.01); *C04B 2235/3804* (2013.01); *C04B 2235/422* (2013.01); *C04B 2235/616* (2013.01); *C04B 2235/80* (2013.01); *F01D 5/284* (2013.01); *Y10T 428/24694* (2015.01); *Y10T 428/249981* (2015.04)

(58) Field of Classification Search
CPC ..... C04B 35/117; C04B 35/185; C04B 35/14; C04B 35/481
USPC .... 264/643, 640, 642, 259, 678; 416/241 B; 428/448, 312.6
See application file for complete search history.

(56) References Cited

U.S. PATENT DOCUMENTS

| 543,153 A | 7/1895 | Kidder |
| 3,709,772 A * | 1/1973 | Rice ............................. 138/146 |

(Continued)

FOREIGN PATENT DOCUMENTS

| EP | 2578553 A2 | 4/2013 |
| FR | 2857660 A1 | 1/2005 |

(Continued)

OTHER PUBLICATIONS

Search Report and Written Opinion from corresponding EP Application No. 12190985, dated Jun. 24, 2013.

(Continued)

*Primary Examiner* — Nahida Sultana
(74) *Attorney, Agent, or Firm* — McNees Wallace & Nurick LLC

(57) ABSTRACT

A method of forming a ceramic matrix composite component includes providing a formed ceramic member having a cavity, filling at least a portion of the cavity with a ceramic foam. The ceramic foam is deposited on a barrier layer covering at least one internal passage of the cavity. The method includes processing the formed ceramic member and ceramic foam to obtain a ceramic matrix composite component. Also provided is a method of forming a ceramic matrix composite blade and a ceramic matrix composite component.

20 Claims, 6 Drawing Sheets

(51) Int. Cl.
*C04B 35/48* (2006.01)
*C04B 35/488* (2006.01)
*C04B 35/52* (2006.01)
*C04B 35/58* (2006.01)
*C04B 35/653* (2006.01)
*F01D 5/20* (2006.01)
*F01D 5/28* (2006.01)

(56) References Cited

U.S. PATENT DOCUMENTS

| | | | |
|---|---|---|---|
| 4,285,634 A | 8/1981 | Rossman et al. | |
| 5,154,373 A * | 10/1992 | Scott | 244/117 R |
| 5,403,153 A * | 4/1995 | Goetze | 416/229 A |
| 5,573,985 A * | 11/1996 | Weaver | C04B 35/563 |
| | | | 501/103 |
| 5,582,784 A * | 12/1996 | Daws | 264/44 |
| 5,632,320 A * | 5/1997 | Atmur | B22D 19/14 |
| | | | 164/98 |
| 5,634,189 A * | 5/1997 | Rossmann | B22F 3/1109 |
| | | | 428/547 |
| 5,692,373 A * | 12/1997 | Atmur | C04B 35/80 |
| | | | 60/274 |
| 5,879,640 A * | 3/1999 | Atmur | B01D 53/8653 |
| | | | 422/177 |
| 6,428,280 B1 | 8/2002 | Austin et al. | |
| 6,435,824 B1 | 8/2002 | Schell et al. | |
| 6,497,776 B1 * | 12/2002 | Butler | B32B 18/00 |
| | | | 156/145 |
| 6,544,003 B1 | 4/2003 | Grylls et al. | |
| 6,648,596 B1 | 11/2003 | Grylls et al. | |
| 6,676,077 B1 * | 1/2004 | DiChiara et al. | 244/117 R |
| 6,723,279 B1 * | 4/2004 | Withers | A63B 53/04 |
| | | | 419/12 |
| 6,730,413 B2 * | 5/2004 | Schaeffer et al. | 428/632 |
| 6,755,619 B1 * | 6/2004 | Grylls et al. | 416/224 |
| 6,916,551 B2 * | 7/2005 | Torigoe et al. | 428/633 |
| 7,063,886 B2 | 6/2006 | Thebault et al. | |
| 7,083,384 B2 * | 8/2006 | Bosselmann et al. | 416/146 R |
| 7,144,220 B2 * | 12/2006 | Marcin, Jr. | 416/97 A |
| 7,189,459 B2 * | 3/2007 | Jackson et al. | 428/446 |
| 7,309,530 B2 * | 12/2007 | Spitsberg et al. | 428/632 |
| 7,364,806 B2 * | 4/2008 | Matsumoto et al. | 428/701 |
| 7,410,342 B2 * | 8/2008 | Matheny | 415/115 |
| 7,597,838 B2 | 10/2009 | Subramanian et al. | |
| 7,600,979 B2 | 10/2009 | Steibel et al. | |
| 7,655,326 B2 * | 2/2010 | Torigoe et al. | 428/701 |
| 7,837,440 B2 | 11/2010 | Bunker et al. | |
| 8,043,720 B2 | 10/2011 | Corman et al. | |
| 8,047,773 B2 | 11/2011 | Bruce et al. | |
| 8,075,279 B2 * | 12/2011 | Ahmad et al. | 416/241 B |
| 2002/0079604 A1 * | 6/2002 | Davis | C04B 30/02 |
| | | | 264/43 |
| 2004/0056151 A1 * | 3/2004 | DiChiara, Jr. | B64C 5/00 |
| | | | 244/117 R |
| 2005/0249602 A1 * | 11/2005 | Freling | B22F 5/009 |
| | | | 416/241 B |
| 2007/0275177 A1 * | 11/2007 | Mack | B28B 1/38 |
| | | | 427/430.1 |
| 2009/0005232 A1 * | 1/2009 | Hand | B32B 3/12 |
| | | | 501/95.2 |
| 2010/0096779 A1 * | 4/2010 | Corden et al. | 264/338 |
| 2010/0236759 A1 * | 9/2010 | Wadley | E04C 2/34 |
| | | | 165/104.19 |
| 2011/0027098 A1 | 2/2011 | Noe et al. | |
| 2012/0102706 A1 * | 5/2012 | Gallagher | B01D 53/22 |
| | | | 29/428 |
| 2012/0142526 A1 * | 6/2012 | Del-Gallo | C04B 38/0096 |
| | | | 502/439 |
| 2012/0263595 A1 * | 10/2012 | Evans | F01D 5/3092 |
| | | | 416/189 |
| 2013/0084189 A1 * | 4/2013 | Diego | 416/241 B |
| 2013/0094971 A1 * | 4/2013 | Lacy | F01D 5/183 |
| | | | 416/97 R |
| 2014/0099484 A1 * | 4/2014 | Roberts, III | B32B 18/00 |
| | | | 428/201 |
| 2014/0271153 A1 * | 9/2014 | Uskert | F01D 5/187 |
| | | | 415/177 |
| 2014/0321994 A1 * | 10/2014 | Brzek | F01D 25/12 |
| | | | 415/175 |
| 2016/0146021 A1 * | 5/2016 | Freeman | F01D 5/284 |
| | | | 416/95 |

FOREIGN PATENT DOCUMENTS

| | | |
|---|---|---|
| JP | 2006-528126 A | 12/2006 |
| JP | 2008-151117 A | 7/2008 |

OTHER PUBLICATIONS

Unofficial Partial English Translation of Notification of Preliminary Rejection issued in connection with corresponding JP Application No. 2012-239716 on Dec. 20, 2016.

* cited by examiner

METHOD OF FORMING A CERAMIC MATRIX COMPOSITE AND A CERAMIC MATRIX COMPONENT

STATEMENT REGARDING FEDERALLY SPONSORED RESEARCH

This invention was made with Government support under contract number DE-FC26-05NT42643 awarded by the Department of Energy. The Government has certain rights in the invention.

FIELD OF THE INVENTION

The present invention relates generally to gas turbines for power generation and more specifically to methods of forming ceramic matrix composite components including turbine blades and ceramic matrix composite components for gas turbines.

BACKGROUND OF THE INVENTION

Silicon carbide (SiC)-based ceramic matrix composite (CMC) materials have been proposed as materials for certain components of gas turbine engines, such as the turbine blades and vanes. Various methods are known for fabricating SiC-based CMC components, including Silicomp, melt infiltration (MI), chemical vapor infiltration (CVI), polymer inflation pyrolysis (PIP), and oxide/oxide processes. Though these fabrication techniques significantly differ from each other, each involves the use of hand lay-up and tooling or dies to produce a near-net-shape part through a process that includes the application of heat at various processing stages.

As with turbine blades and vanes formed from more conventional superalloy materials, CMC blades and vanes are primarily equipped with cavities and cooling passages to reduce weight, reduce centrifugal load, and reduce operating temperatures of the components. These features are typically formed in CMC components using a combination of removable and expendable tooling.

Current fabrication methods for forming internal passages or cavities in CMC components use materials that need to be "melted" out or removed from the internal passage during the burn-out cycle. Forming CMC component with a cavity includes a number of steps, including using pre-forms. First, a plurality of ceramic plies, some of which can include reinforcing material or are pre-impregnated with matrix, are laid up on a mandrel or mold in a pre-determined pattern to provide desired final or near-net-shape and desired mechanical properties of component. The mandrel is generally selected from materials such as tin, vinyl, or other meltable materials. The laid-up plies may be pre-impregnated (prepreg) with matrix material, such as SiC or impregnated with matrix after lay-up of the plies. Prior to densification of the CMC pre-form, the mandrel is removed through a burn-out cycle. In the burn-out cycle, the CMC pre-form is inverted and the mandrel forming materials, such as tin, vinyl, or other meltable materials are melted out through the open tip of the pre-form CMC leaving an open tip area.

After the burn-out cycle, the CMC pre-form blade is very fragile due to burn-off of the volatile substances of the composite. The open tip area of the CMC pre-form requires capping or closing before use in gas turbines. In known processes, to close the open tip area of the CMC pre-form a tip cap is inserted into the fragile open tip area. The tip cap can be formed form of a CMC laminate part having a number of plies, generally 20-50 plies, and shaped as the open tip area to fill the open tip area of the CMC pre-form. Forming the CMC laminate tip cap by cutting out the CMC plies to the desired shape and laying up the plies in the desired geometry is time and labor intensive. Challenges also arise with placing the CMC laminate having a number of plies into the open tip area. Additionally, because both the CMC laminate and pre-form blade are fragile prior to densifying, these components can be easily damaged during assembly.

Therefore, methods of forming ceramic matrix composite components and ceramic matrix composite components for gas turbines that do not suffer from the above drawbacks is desirable in the art.

SUMMARY OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

According to an exemplary embodiment of the present disclosure, a method of forming a ceramic matrix composite component is provided. The method includes providing a formed ceramic member having a cavity. The method includes filling at least a portion of the cavity with a ceramic foam. The method includes processing the formed ceramic member and ceramic foam to obtain a ceramic matrix composite component.

According to another exemplary embodiment of the present disclosure, a method of forming a ceramic matrix composite blade is provided. The method includes providing a partially cured ceramic matrix composite blade shell, wherein the ceramic matrix composite blade shell has a cavity and the ceramic matrix composite blade shell has at least one internal passage. The method includes applying a barrier layer adjacent to the at least one internal passage in the cavity of the ceramic matrix composite blade shell. The method includes filling at least a portion of the cavity with a ceramic foam, the ceramic foam being applied to the barrier layer and operable to form a tip member. The method includes processing the partially cured ceramic matrix composite blade shell and the tip member to form a ceramic matrix composite blade.

According to another exemplary embodiment of the present disclosure, a ceramic matrix composite component is provided. The component includes a formed ceramic member having a cavity. A barrier layer is applied to the cavity of the formed member and a ceramic foam is applied to the barrier layer filling the cavity. The formed ceramic member including the ceramic foam is processed to form a ceramic matrix composite component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
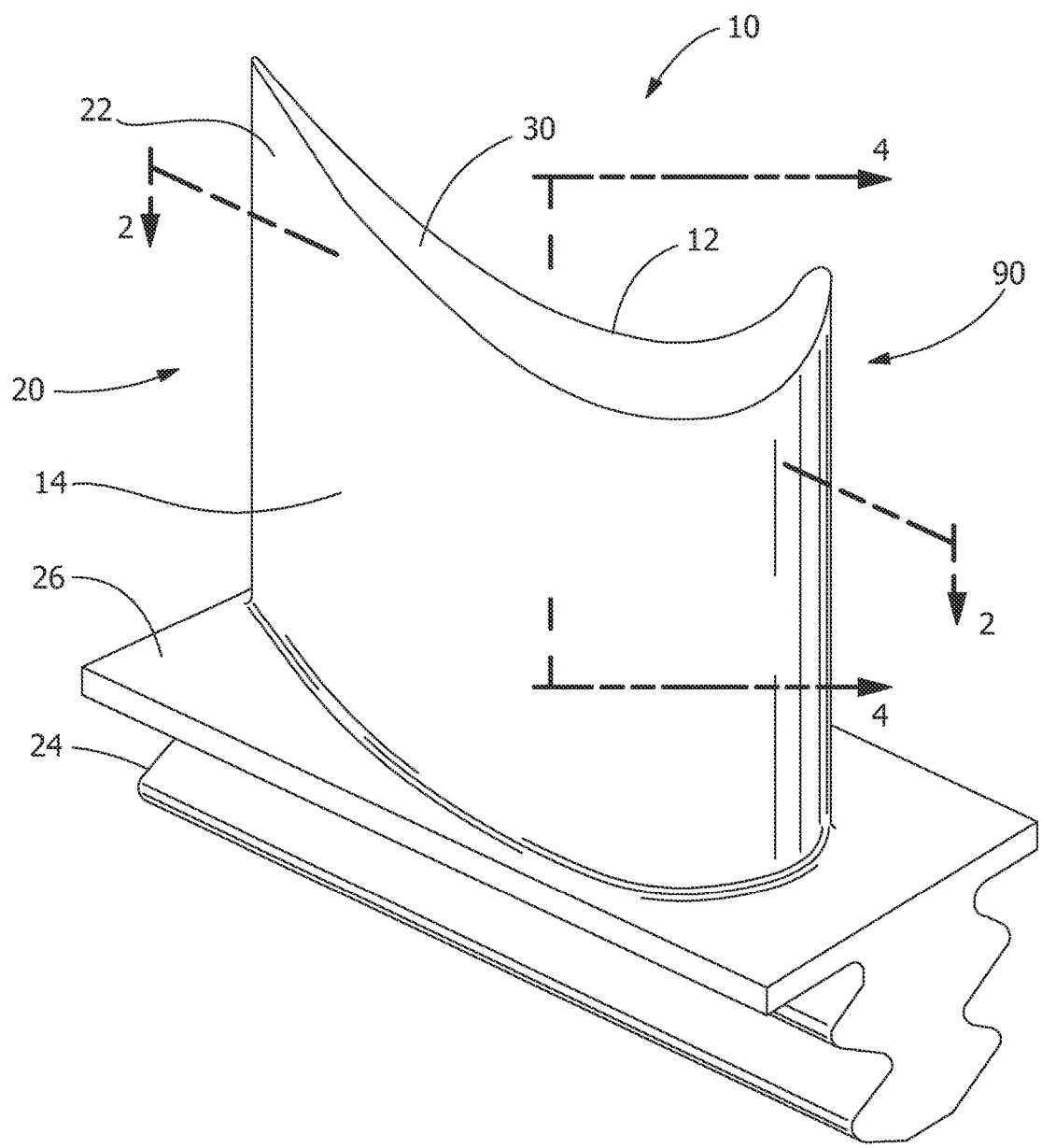
FIG. 1 is a perspective view of a ceramic matrix composite component of the present disclosure.

Provided is an economically viable method of forming a ceramic matrix composite (CMC) component, a method of forming a CMC blade, and a CMC component that do not suffer from the drawbacks in the prior art. CMC components, according to the present disclosure, minimize or eliminate additional hand lay-up steps in forming CMC components. One advantage of an embodiment of the present disclosure includes a method that avoids the time consuming ply cutting and had lay-up of laminate plies to close internal passages in a CMC component, such as a turbine blade. Another advantage is that no lay-up tools are necessary to form the CMC component using the presently disclosed method. Yet another advantage is that the presently disclosed method does not require assembly of a plurality of plies and additional manufacturing steps to form a "tip cap" laminate part used to seal internal passage of CMC components. Another advantage is that the presently disclosed method and CMC component avoids gap fit issues present in current lay-up and "tip cap" laminate part processes. Another advantage is the presently disclosed method does not require complicated assembly while the CMC pre-form is in its most fragile state. Yet another advantage is that current method does not require additional machining after rigidization of the CMC component.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Systems used to generate power include, but are not limited to, gas turbines, steam turbines, and other turbine assemblies. In certain applications, the power generation systems, including the turbomachinery therein (e.g., turbines, compressors, and pumps) and other machinery may include components that are exposed to heavy wear conditions. For example, certain power generation system components such as blades, casings, rotor wheels, shafts, shrouds, nozzles, and so forth, may operate in high heat and high revolution environments. These components are manufactured using ceramic matrix composites and these components may also include cooling passages. The present disclosure provides a more economically and less labor-intensive method to form CMC components including cooling passages. An exemplary embodiment of the disclosure is shown in FIGS. 1-5 as a turbine blade, but the present disclosure is not limited to the illustrated structure.

FIG. 1 is a perspective view of a ceramic matrix composite (CMC) component 10 of a gas turbine. In one embodiment, component 10 is, but not limited to, gas turbine engine components, including combustor components, high pressure turbine vanes and blades, and other hot section components, such as but not limited to, ceramic box shrouds and nozzle applications. For illustrative purposes, the CMC component 10 FIGS. 1-5, is a turbine blade 20. Component 10 includes a formed ceramic member 90 having tip portion 32 (see FIGS. 3 and 4) including ceramic foam 80 (see FIG. 5). Ceramic foam 80 remains in place during operation of CMC component 10 in gas turbine and "caps" or closes the open internal passages 50 of CMC component 10 (see FIGS. 2, 4, and 5). Ceramic foam 80 is formed from a material that withstands the CMC curing process and becomes a part of the final CMC component 10.

FIG. 1 depicts a CMC component 10 such as a turbine blade 20 or turbine vane, and in this illustration turbine blade 20. Turbine blade 20 is preferably formed of a ceramic matrix composite (CMC) material. Material for CMC component 10 includes, but is not limited to, oxide based CMCs such alumina, mullite, boron nitride, boron carbide, sialons (silicon, aluminium, oxygen, and nitrogen), intermetallics, and combinations thereof. A suitable example of material for CMC component 10 is, but not limited to, AN-720 (oxide-oxide based), which is available from COI Ceramics, Inc., San Diego, Calif. Turbine blade 20 includes an airfoil 22 against which the flow of hot exhaust gas is directed. Turbine blade 20 is mounted to a turbine disk (not shown) by a dovetail 24 which extends downwardly from airfoil 22 and engages a slot on the turbine disk. A platform 26 extends laterally outwardly from the area where airfoil 22 is joined to dovetail 24. Turbine blade 20 includes at least one internal passage 50 (see FIG. 2) extending along the interior of airfoil 22. During operation of power generation system, a flow of cooling air is directed through internal passages 50 to reduce the temperature of airfoil 22.

Figure 4:
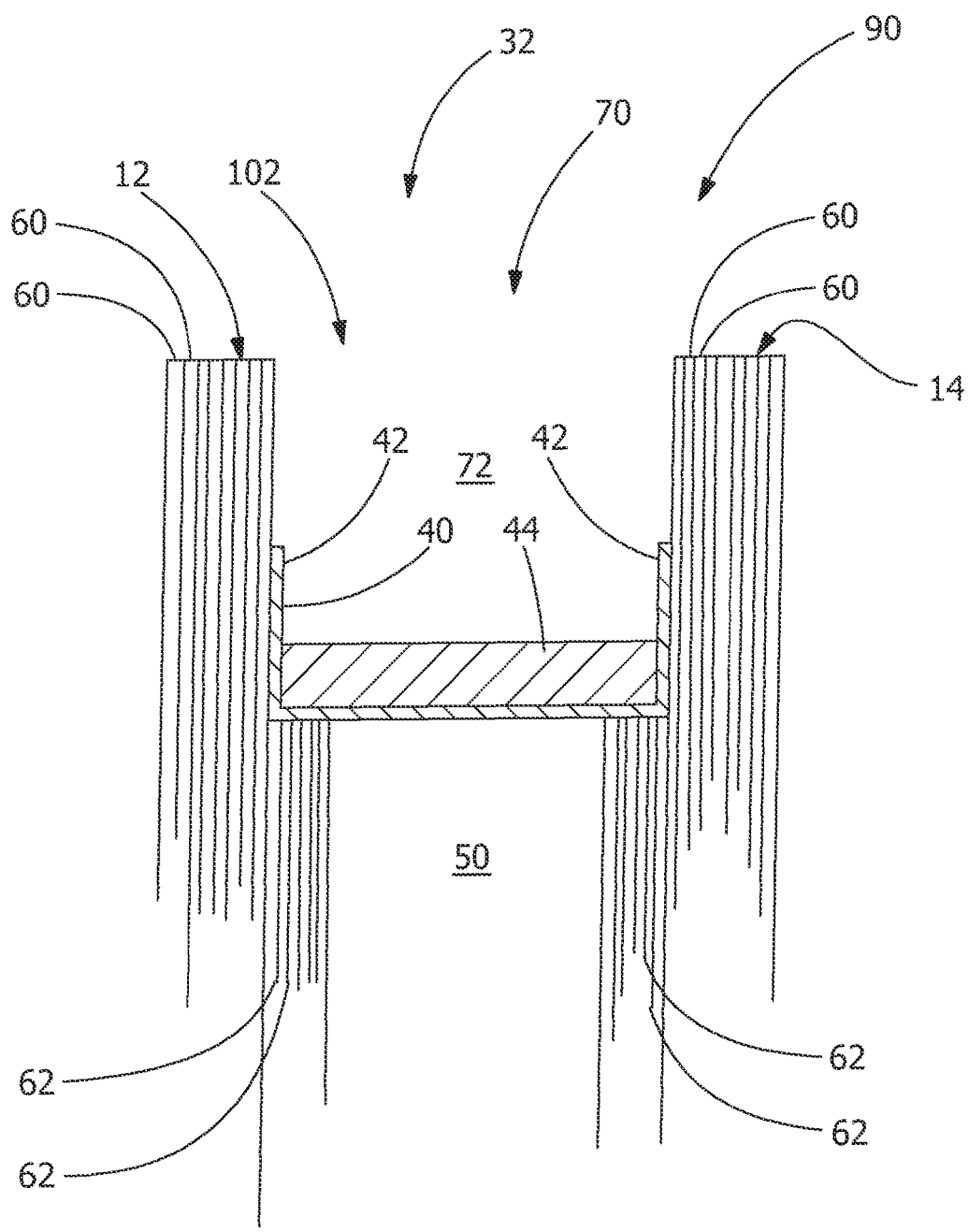
FIG. 4 is a sectional view taken in direction 4-4 of FIG. 1 including cavity prior to filling with ceramic foam of the ceramic matrix composite component of the present disclosure.
Figure 5:
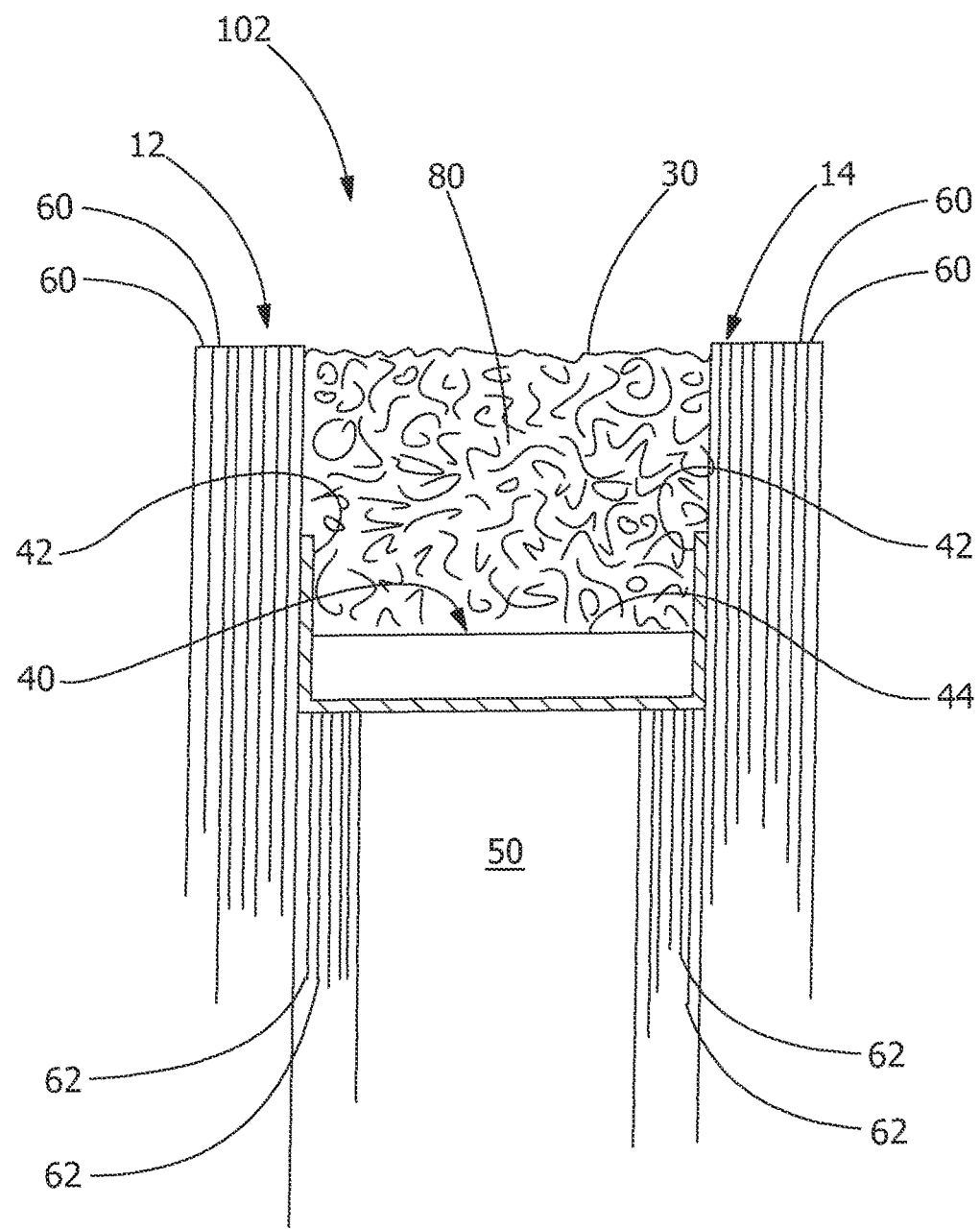
FIG. 5 is a schematic view of the ceramic matrix composite component of FIG. 4 including a cavity filled with ceramic foam of the present disclosure.

CMC turbine blade 20, as shown in FIG. 1, is constructed using a lay-up technique to form a near-net shape pre-form of formed ceramic member 90 (see FIGS. 4 and 5). Formed ceramic member 90 is laid-up using any suitable lay-up technique to achieve desired shape and geometry for component 10. Most lay-up techniques used to form components 10 having at least one internal passage 50 include providing and positioning a plurality of plies on a mandrel or other mold. In some embodiments, mandrel (not shown) is "melted" or leached out of formed ceramic member 90 after it has been melt-infiltrated. In laying-up formed ceramic member 90 an opening must be left to allow mandrel to be melted out of formed ceramic member 90 to create at least one internal passage 50 (see FIG. 2). Prior to operation of component and prior to densifying, the open passage must be "capped" or closed. Currently, a plurality of plies, generally between 25-50 plies, are used to form a ceramic laminate part or cap, which is placed in the open tip of a blade prior to densification and final melt-infiltration.

Figure 2:
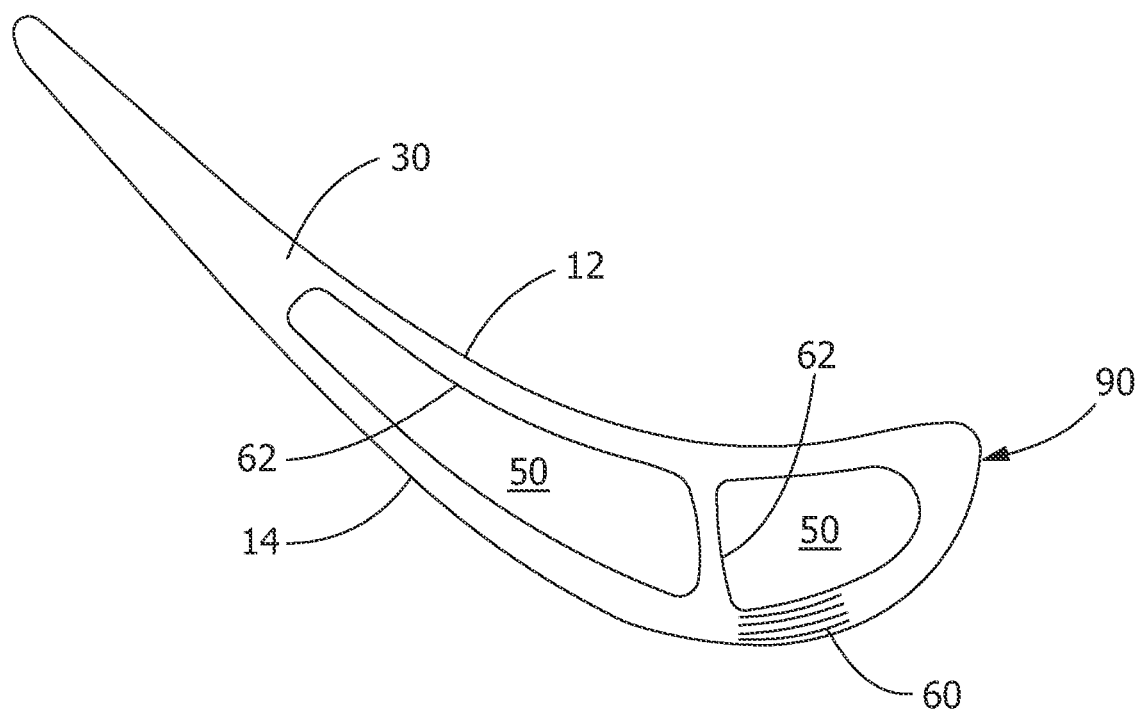
FIG. 2 is a sectional view taken in direction 2-2 of FIG. 1 showing cavities in the ceramic matrix composite component of the present disclosure.

FIG. 2 is a sectional view of blade tip 30 taken in direction 2-2 of FIG. 1 showing internal passages 50 of formed ceramic member 90. A plurality of core wrap plies 62 and blade plies 60 (only a few have been shown for clarity) surround and form internal passages 50 of formed ceramic member 90.

Figure 3:
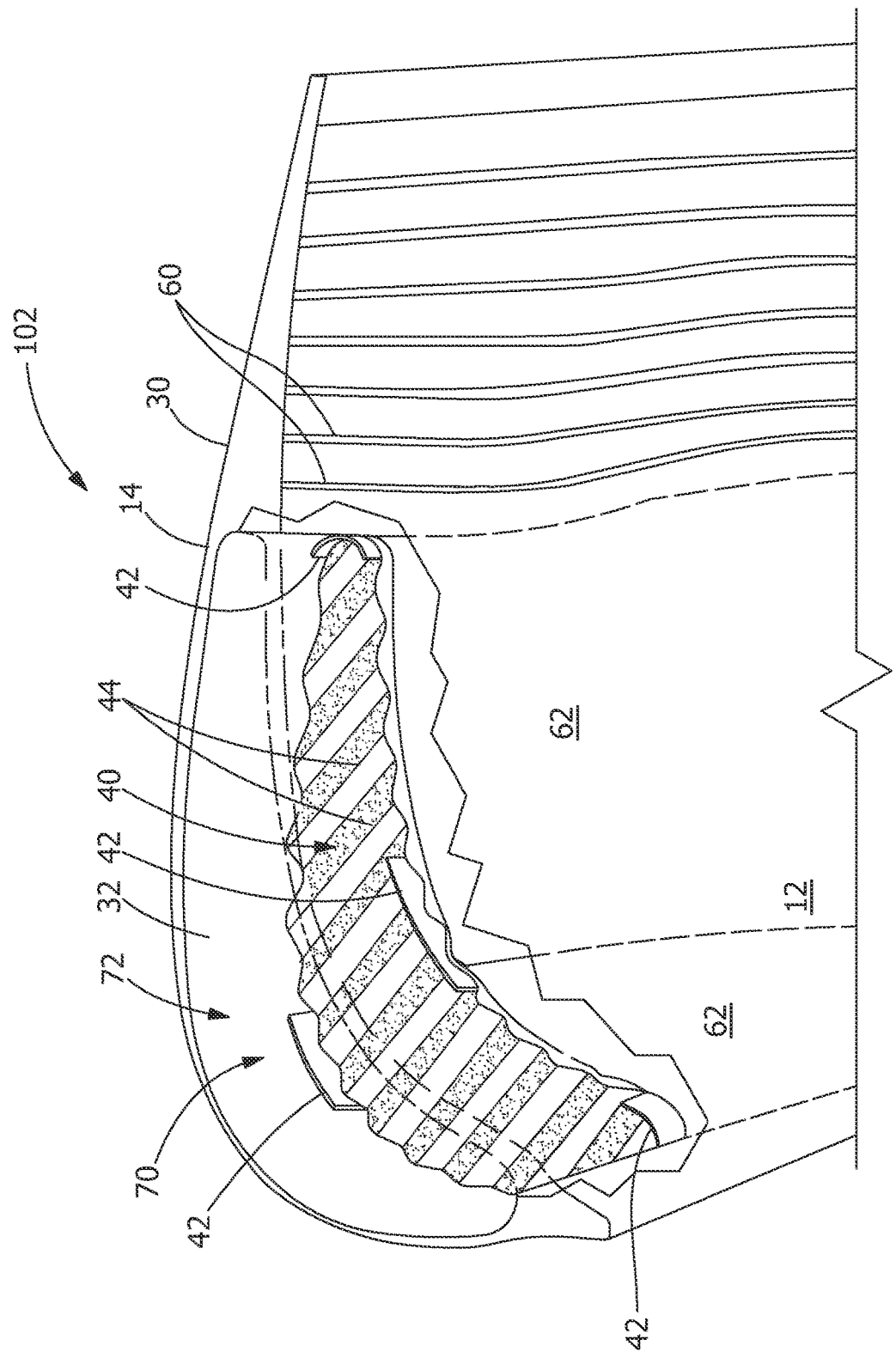
FIG. 3 is a schematic partially transparent perspective view of the tip of the ceramic matrix composite of the present disclosure.

As shown in FIGS. 3-5, blade shell 102 is an exemplary embodiment of formed ceramic members 90; however, this exemplary embodiment of formed ceramic member 90 is for illustrative purposes, and should not be so narrowly construed. Formed ceramic member 90 is any pre-formed CMC component, such as but not limited to, blades, shrouds and nozzles.

Returning to FIG. 3, a barrier layer 40 is positioned adjacent to or covering internal passages 50 turbine blade 20 to form a cavity 70 in formed ceramic member 90. Barrier layer 40 is selected from materials that are thermally compatible with formed ceramic member 90 and ceramic foam 80. Suitable examples of material for barrier layer 40 include, but are not limited to ceramic matrix plies, such as oxide and non-oxide ceramics and CMCs, for example, but not limited to boron, nitride, mullite, aluminia, boron nitride, boron carbide, sialons (silicon, aluminium, oxygen, and nitrogen), intermetallics, and combinations thereof. Barrier layer 40 seals off internal passages 50 and in combination formed ceramic member 90 create cavity 70 which operates as mold 72 for receiving ceramic foam 80 (see FIG. 5). If ceramic foam 80 is applied directly to blade tip of formed ceramic member 90 having internal passages 50 or hollow cores, ceramic foam 80 will fill internal passages 50. Barrier layer 40 provides a mold 72 for receiving ceramic foam and prevents ceramic foam from filling internal passages 50. Barrier layer 40 can be flat or corrugated. As shown in FIG. 3, corrugated barrier layer 40 includes a number of crests 44. Barrier layer 40 also includes at least one tab member 42. Tab members 42 are operable to adhere to cavity 70 that operates as mold 72. Geometry of tab member 42 of barrier layer 40 is any suitable geometry to provide enough surface area to allow tab members 42 to adhere or stick to cavity 70 or mold 72 to prevent barrier layer 40 from moving prior to and during filling of cavity 70 with ceramic foam 80. As shown in FIG. 3, four tab members 42 adhere to mold 72. In an alternative embodiment, as few as one tab member 42 is needed and any number of tab members 42 can be used to adhere barrier layer 40 to mold 72.

Turning now to FIG. 4, cavity 70 and mold 72 formed in formed ceramic member 90 are more clearly shown. Formed ceramic member 90 includes a plurality of core wrap plies 62 surrounding internal passage 50 and blade plies 60 surrounding core wrap plies 62 and internal passage 50. In this embodiment, barrier layer 40 is situated adjacent core wrap plies 62 and blade plies 60 and covering internal passage 50. Barrier layer 40 cooperates with core wrap plies 62 and blade plies 60 to form mold 72. Generally, barrier layer 40 tab members 42 adhere to mold 72 or cavity 70. As shown in FIG. 4, tab members 42 adhere to core wrap plies 62.

As shown in FIGS. 4 and 5, cavity 70 and mold 72 are filled with ceramic foam 80. Ceramic foam 80 is applied to barrier layer 40 and fills cavity 70 and mold 72 in formed component 90. Ceramic foam 80 is selected from materials including alumina, mullite, silica, zirconia, zircon, silicon, carbon, silicon boron, and combinations thereof. Ceramic foam 80 is applied using any known application techniques, such as but not limited to depositing and spraying techniques. After ceramic foam 80 sufficiently fills cavity 70 formed component 90 and ceramic foam 80 are further processed by infiltrating to obtain the final CMC component 10.

Infiltrating process includes any suitable infiltrating process, for example, but not limited to melt infiltration (MI) to complete the construction of CMC component 10. A silicon boron material, such as tetraboride ($SiB_4$), silicon hexaboride ($SiB_6$), or combinations thereof, is melted into formed member 90 including ceramic foam 80 using a wicking, gating, or other suitable process. During the MI process, the silicon boron material is absorbed by capillary absorption into all the carbon cavities that exist in formed member 90 and ceramic foam 80. After melt infiltration, ceramic matrix composite component 10 is optionally machined to desired dimensions and specifications. Final CMC component 10 is optionally coated with a thermal or erosion barrier coating to provide additional protection during operation.

Figure 6:
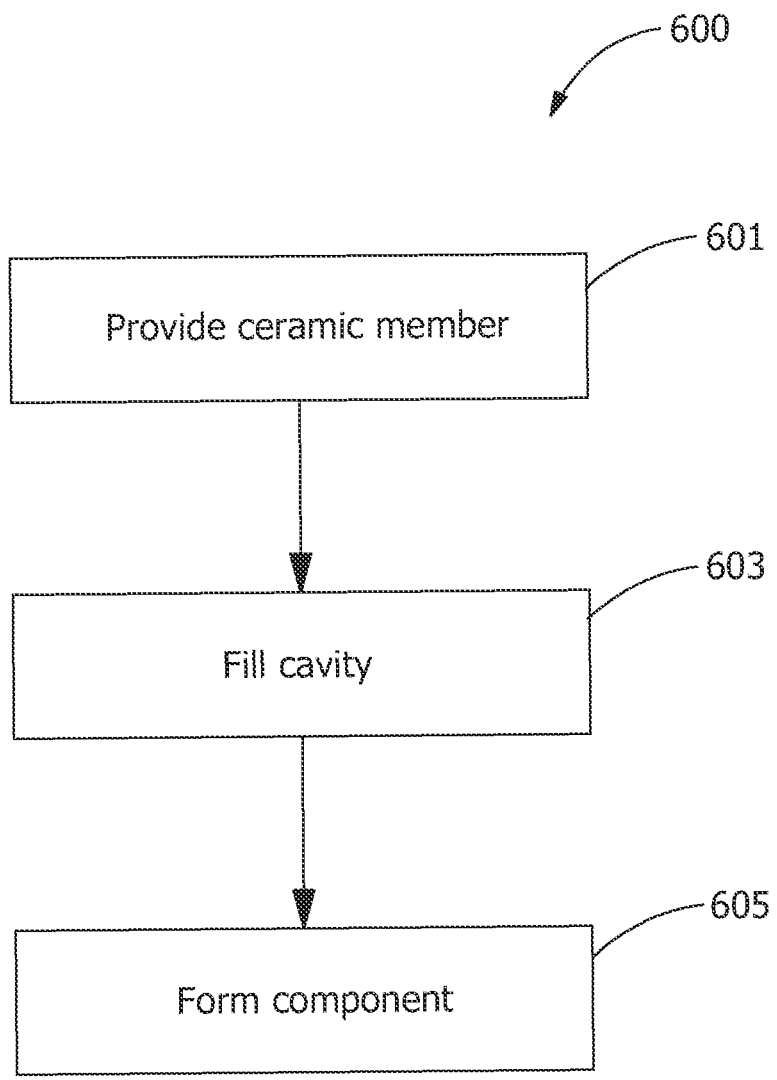
FIG. 6 is a flow chart of the method of forming the ceramic matrix composite component of the present disclosure.

A method 600 of forming a ceramic matrix composite component 10 is shown in FIG. 6. Method 600 includes providing formed ceramic member 90 having cavity 70, step 601 (see FIG. 4). As shown in FIG. 4, cavity 70 is operable as a mold 72. Also shown in FIG. 4, formed ceramic member 90 may include at least one internal passage 50. Formed ceramic member 90 is constructed using any suitable process including a hand lay-up process using a mandrel. The pre-form of formed ceramic member 90 under goes an initial infiltration with silicon boron or other suitable material. Next, the pre-form is autoclaved. Then the mandrel is removed using any suitable process, such as but not limited to, leaching, and burn-out of volatile organics. After mandrel is removed, formed ceramic member 90 remains. In embodiments having internal passages 50, prior to the step of filling, step 603, barrier layer 40 is applied to at least one internal passage 50 adjacent to mold 72 of formed ceramic member 90. Method 600 includes filling at least a portion of cavity 70 operating as mold 72 with ceramic foam 80, step 603 (see FIG. 5). As shown in FIG. 5, in one embodiment, ceramic foam 80 is deposited on barrier layer 40 covering cavity 70 of formed ceramic matrix member 90. Method 600 includes processing formed ceramic member 90 and ceramic foam 80 to obtain a ceramic matrix composite component 10, step 605 (see FIG. 1). The step of processing, step 605 includes infiltrating formed ceramic member 90 and ceramic foam 80 to obtain ceramic matrix composite component 10. Any suitable material can be used for infiltrating, but one suitable example includes a silicon boron material. Any suitable infiltration methods, such as melt infiltration may be used. The step of processing, step 605 further includes the step, prior to the step of infiltrating, of evaporating resins from ceramic foam 80. After the step of processing, step 605, ceramic matrix composite component 10 is optionally machined to desired dimensions and specifications.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

What is claimed is:

1. A method of forming a ceramic matrix composite component, the method comprising the steps in the order of:
   providing a formed ceramic member; then
   inserting a barrier layer into the formed ceramic member to contact the formed ceramic member, the barrier layer and the formed ceramic member defining a cavity on a first side of the barrier layer, and the barrier layer and the formed ceramic member defining an internal passage on a second side of the barrier layer opposite the first side; then
   filling at least a portion of the cavity on the first side of the barrier layer with a ceramic foam, wherein the cavity serves as a mold such that the mold defines a shape of at least a portion of the ceramic foam; and then
   processing the formed ceramic member and the ceramic foam to obtain the ceramic matrix composite component.

2. The method of claim 1, wherein the step of processing includes infiltrating the formed ceramic member and the ceramic foam to obtain the ceramic matrix composite component.

3. The method of claim 2, wherein the step of processing further includes the step, prior to the step of infiltrating, of evaporating resins from the ceramic foam.

4. The method of claim 2, wherein the step of infiltrating includes infiltrating with a silicon boron material.

5. The method of claim 1, wherein the barrier layer includes at least one tab member, wherein the at least one tab member is operable to adhere to the formed ceramic member.

6. The method of claim 1, wherein the barrier layer includes a corrugated geometry comprising a plurality of crests defining part of the mold.

7. The method of claim 1, further including a step of, after the step of processing, of machining the ceramic matrix composite component.

8. The method of claim 1, wherein the ceramic foam includes a material selected from alumina, mullite, silica, zirconia, zircon, silicon carbon, silicon boron, and combinations thereof.

9. A method of forming a ceramic matrix composite blade comprising:
   providing a partially cured ceramic matrix composite blade shell, wherein the partially cured ceramic matrix composite blade shell has a cavity and the partially cured ceramic matrix composite blade shell has at least one internal passage;
   applying a barrier layer adjacent to the at least one internal passage in the cavity of the partially cured ceramic matrix composite blade shell;
   filling at least a portion of the cavity with a ceramic foam, the ceramic foam being applied to the barrier layer and operable to form a tip member; and
   processing the partially cured ceramic matrix composite blade shell and the tip member to form a ceramic matrix composite blade.

10. The method of claim 9, wherein the step of processing includes infiltrating the partially cured ceramic matrix composite blade shell and tip member ceramic foam to obtain the ceramic matrix composite blade.

11. The method of claim 10, wherein the step of processing further includes the step, prior to the step of melt infiltrating, of evaporating resins from the ceramic foam of the tip member.

12. The method of claim 9, wherein the barrier layer includes at least one tab member, wherein the tab member adheres to the mold of the formed ceramic member.

13. The method of claim 9, wherein the barrier layer has a corrugated geometry.

14. The method of claim 9, further including a step of, after the step of processing, of machining the ceramic matrix composite component.

15. The method of claim 9, wherein the ceramic foam includes a material selected from alumina, mullite, silica, zirconia, zircon, silicon carbon, silicon boron, and combinations thereof.

16. The method of claim 1, wherein the ceramic matrix composite component comprises a gas turbine component.

17. The method of claim 16, wherein the gas turbine component comprises a gas turbine blade.

18. The method of claim 1, wherein the barrier layer prevents ceramic foam in the mold from filling the internal passage.

19. The method of claim 18, wherein filling comprises spraying the ceramic foam.

20. A method of forming a ceramic matrix composite component comprising:
   providing a formed ceramic member; then
   inserting a barrier layer into the formed ceramic member, the barrier layer and the formed ceramic member defining a cavity on a first side of the barrier layer and an internal passage on a second side of the barrier layer opposite the first side; then
   filling at least a portion of the cavity on the first side of the barrier layer with a ceramic foam, wherein the cavity serves as a mold such that the mold defines a shape of at least a portion of the ceramic foam; and then
   infiltrating the formed ceramic member and the ceramic foam with a silicon boron material to obtain the ceramic matrix composite component.

* * * * *